United States Patent
Takamura et al.

(10) Patent No.: US 8,982,012 B2
(45) Date of Patent: Mar. 17, 2015

(54) MANAGEMENT APPARATUS, MANAGEMENT SYSTEM AND MANAGEMENT METHOD

(75) Inventors: Shunsuke Takamura, Hachioji (JP); Tetsuhiro Shibata, Sagamihara (JP); Tatsuya Eguchi, Hachioji (JP); Tsutomu Suka, Fussa (JP); Keiichiro Hyodo, Kokubunji (JP); Masayuki Inoue, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 739 days.

(21) Appl. No.: 13/188,846

(22) Filed: Jul. 22, 2011

(65) Prior Publication Data

US 2012/0032873 A1 Feb. 9, 2012

(30) Foreign Application Priority Data

Aug. 3, 2010 (JP) ................................. 2010-174692

(51) Int. Cl.
*G06F 3/00* (2006.01)
*G06F 17/00* (2006.01)
(Continued)

(52) U.S. Cl.
CPC ............ *H04N 1/00891* (2013.01); *G06F 3/147* (2013.01); *H04N 1/00904* (2013.01); *G09G 2330/021* (2013.01); *G09G 2380/14* (2013.01)
USPC ............. 345/1.1; 345/1.2; 715/203; 715/716; 715/718

(58) Field of Classification Search
CPC ......... G06F 13/00; G06F 12/10; G06F 13/14; G06F 3/00; G06F 13/38
USPC ...................................................... 345/1.1–3
See application file for complete search history.

(56) References Cited

U.S. PATENT DOCUMENTS 7,098,898 B2 * 8/2006 Hattori et al.
2001/0001083 A1 * 5/2001 Helot ............................ 439/131
(Continued)

FOREIGN PATENT DOCUMENTS

JP 5-12137 A 1/1993
JP 7-36937 A 2/1995
(Continued)

OTHER PUBLICATIONS

Notice of Reasons for Refusal for Japanese Patent Application No. 2010-174692, mailed Oct. 25, 2013, with English translation.

*Primary Examiner* — Kent Chang
*Assistant Examiner* — William Lu
(74) *Attorney, Agent, or Firm* — Cantor Colburn LLP

(57) ABSTRACT

Disclosed is a management apparatus, which makes it possible to use an information viewing apparatus without considering the residual amount of the battery, provided therein. The apparatus includes: a plurality of slots to support a plurality of information viewing apparatuses, each of which is activated by an electric power fed from a battery provided therein and is to be inserted into each of the slots in a detachable manner; and a controlling section to control the plurality of information viewing apparatuses, respectively inserted into the slots. When a predetermined information viewing apparatus is inserted into one of the plurality of slots, the controlling section moves data stored in the predetermined information viewing apparatus to another information viewing apparatus, which is currently inserted into another one of the plurality of slots, depending on a residual amount of the battery provided in the predetermined information viewing apparatus.

10 Claims, 10 Drawing Sheets

(51) Int. Cl.
*G09G 5/00* (2006.01)
*H04N 1/00* (2006.01)
*G06F 3/147* (2006.01)

(56) References Cited

U.S. PATENT DOCUMENTS

| | | | |
|---|---|---|---|
| 2005/0257145 A1* | 11/2005 | Gage | |
| 2006/0284857 A1* | 12/2006 | Oh | 345/173 |
| 2007/0025367 A1* | 2/2007 | Wijnands | 370/401 |
| 2008/0138046 A1* | 6/2008 | Nakazawa | 386/124 |
| 2008/0155583 A1* | 6/2008 | Falcon | 725/14 |
| 2009/0147714 A1* | 6/2009 | Jain et al. | 370/311 |
| 2010/0156913 A1* | 6/2010 | Ortega et al. | 345/520 |
| 2010/0250975 A1* | 9/2010 | Gill et al. | 713/300 |
| 2010/0323763 A1* | 12/2010 | Englebrecht et al. | 455/566 |
| 2012/0306811 A1* | 12/2012 | Farmer et al. | 345/174 |

FOREIGN PATENT DOCUMENTS

| | | |
|---|---|---|
| JP | 2002-320177 A | 10/2002 |
| JP | 2008-122519 A | 5/2008 |
| JP | 2008-203846 A | 9/2008 |
| JP | 2009-229912 A | 10/2009 |
| JP | 2010-86089 A | 4/2010 |

* cited by examiner

FIG. 1
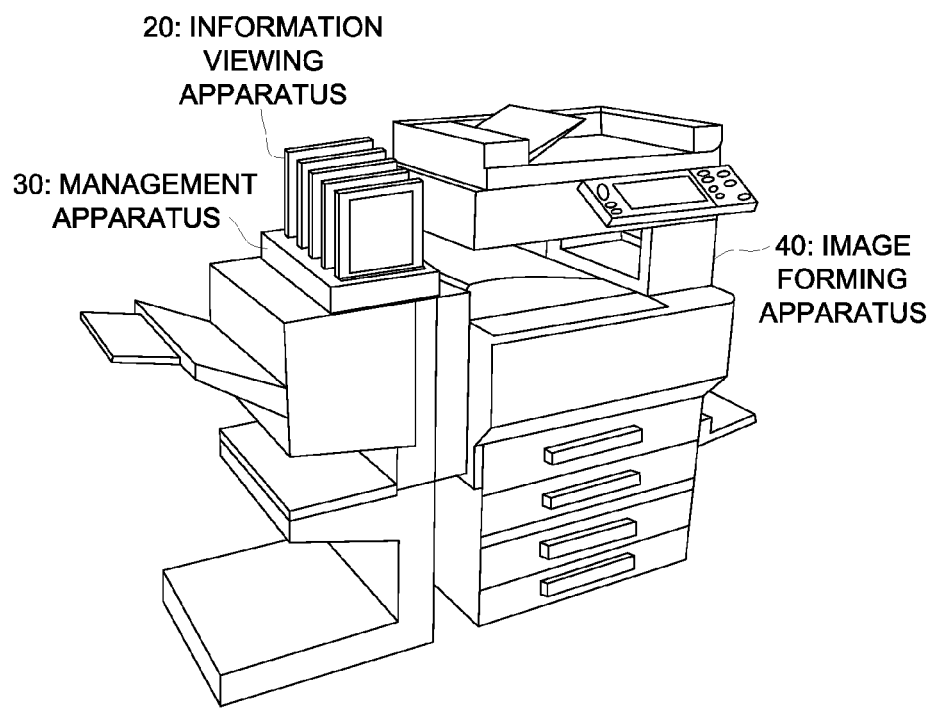
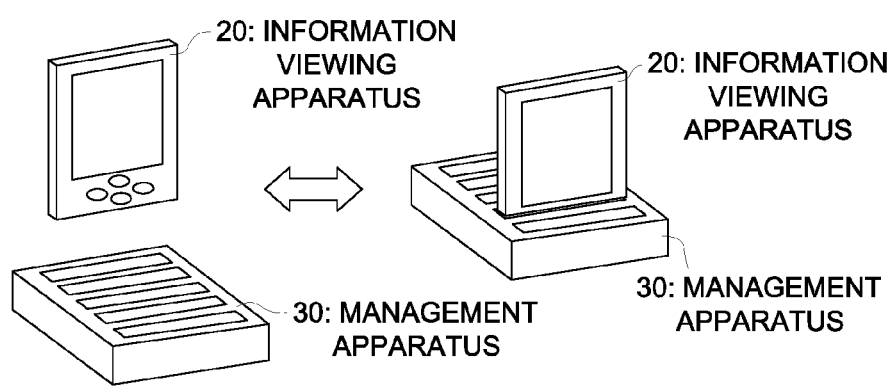

FIG. 10a
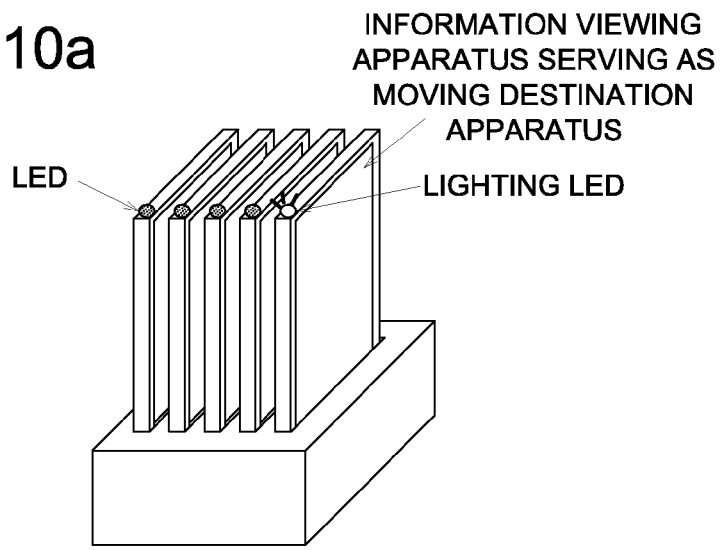
FIG. 10b
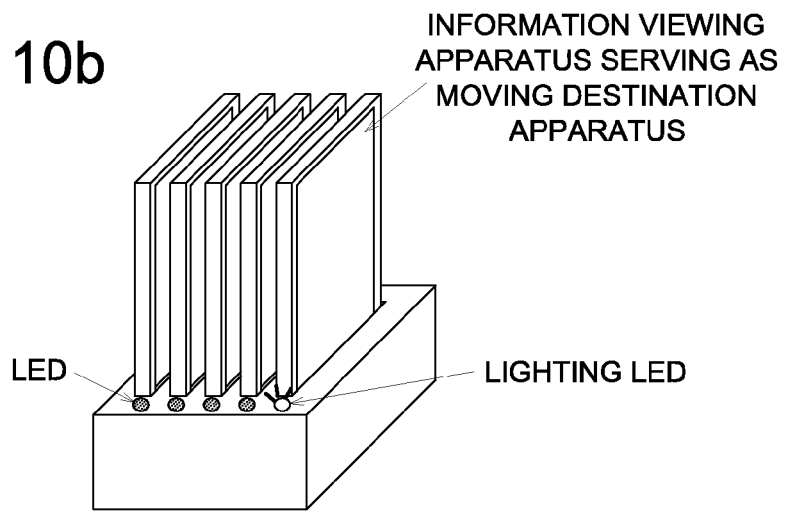
FIG. 11
DATA STORED IN THIS INFORMATION VIEWING APPARATUS HAS BEEN MOVED TO INFORMATION VIEWING APPARATUS INSERTED INTO SLOT **.

DISPLAYING ID WITHIN THIS AREA

ID DISPLAYING SECTION

| SLOT 1 | * * * * * |
| SLOT 2 | * * * * * |
| SLOT 3 | * * * * * |
| SLOT 4 | |
| SLOT 5 | |

ID DISPLAYING SECTION

FIG. 13

| SLOT | STATUS | ELECTRIC CHARGE AMOUNT | LATEST ACCESSING DATE AND TIME |
|------|--------|------------------------|--------------------------------|
| 1 | VACANT | 100% | |
| 2 | USER A | 100% | 2009.12.21 16:00 |
| 3 | | | |
| 4 | USER B | 90% | 2009.12.21 8:30 |
| 5 | VACANT | 50% | |

VACANT INFORMATION VIEWING APPARATUS IS INSTALLED

INFORMATION VIEWING APPARATUS IN WHICH DATA OF USER A IS STORED IS INSTALLED

NO INFORMATION VIEWING APPARATUS IS INSTALLED

MANAGEMENT APPARATUS, MANAGEMENT SYSTEM AND MANAGEMENT METHOD

This application is based on Japanese Patent Application NO. 2010-174692 filed on Aug. 3, 2010, with Japan Patent Office, the entire content of which is hereby incorporated by reference.

BACKGROUND OF THE INVENTION

The present invention relates to a management apparatus, a management system and a management method, and specifically relates to such a management apparatus, a management system and a management method, for managing (controlling) an information viewing apparatus.

In recent years, there have been proliferated in the market various kinds of information viewing apparatuses, each of which is provided with a display section, such as an Electrophoretic Display, etc., and has been utilized in various kinds of usage modes. For instance, instead of outputting conference materials as printed paper sheets, the display section is made to display the contents of the conference materials onto the information viewing apparatus based on the electric data of the conference materials stored in the information viewing apparatus in advance, so as to save the consumption of the resources.

In order to utilize the information viewing apparatus in the abovementioned usage mode, it is necessary to retain the concerned information viewing apparatus in such a state that the electric data, stored therein, is transmittable and receivable. Accordingly, the system has been so constituted that a management apparatus (called, a cradle) is provided for keeping the information viewing apparatus therein in a detachable state, so as to make it possible not only to conduct data communicating operations between the management apparatus and the information viewing apparatus, but also to charge the battery provided in the information viewing apparatus by supplying an electric power from the management apparatus.

In this connection, according to the abovementioned system, at the time when the battery provided in the information viewing apparatus has run down, it becomes impossible to use the electric data stored in the information viewing apparatus. Therefore, it is necessary to monitor the residual amount of the electric power currently stored in the battery concerned.

For instance, as abovementioned technology for monitoring the residual amount of the electric power, Tokkai 2009-229912 (Japanese Patent Application Laid-Open Publication) sets forth an Electrophoretic Display, which is provided with a residual amount detecting section to detect the residual amount of the electric power, currently stored in the battery, and a residual amount notifying section to calculate the displayable number of pages on the basis of the above-detected residual amount of the electric power, so that the residual amount notifying section calculates both the first number of pages, being displayable at the time when only the first rewriting sequence that consumes the largest amount of electric power among a plurality of rewriting sequences, is employed, and the second number of pages, being displayable at the time when only the second rewriting sequence that consumes the smallest amount of electric power among a plurality of rewriting sequences, is employed, so as to notify the user of both the first and second displayable numbers of pages.

As abovementioned, according to the conventional information viewing system, there has been such a problem that, when the information viewing apparatus has fallen into an unusable state due to a rundown of the battery or the like, since it is impossible to use the data stored in the information viewing apparatus concerned until the battery is sufficiently charged, the work, performed so far, should be forcibly halted.

Further, by employing the technology set forth in Tokkai 2009-229912, it becomes possible to makes the halt of the work, caused by the shortage of the battery, hardly occur. However, even when the technology set forth in Tokkai 2009-229912 is employed, the user should always gives attention to the residual amount of the battery while using the information viewing apparatus. As a result, there has arisen another problem that the user's usability is impaired.

SUMMARY OF THE INVENTION

To overcome the abovementioned drawbacks in conventional management system, it is one of objects of the present invention to provide a management apparatus, a management system and a managing method, each of which makes it possible to use an information viewing apparatus without considering the residual amount of the battery provided therein.

Accordingly, at least one of the objects of the present invention can be attained by any one of the management apparatuses, the management system and the managing method described as follows.

(1) According to a management apparatus reflecting an aspect of the present invention, the management apparatus, comprises: a plurality of slots to support a plurality of information viewing apparatuses, each of which is activated by an electric power fed from a battery provided therein and is to be inserted into each of the slots in a detachable manner; and a controlling section to control the plurality of information viewing apparatuses, respectively inserted into the slots; wherein, when a first information viewing apparatus, which serves as a predetermined information viewing apparatus among the plurality of information viewing apparatuses, is inserted into one of the plurality of slots, the controlling section moves data stored in the first information viewing apparatus to a second information viewing apparatus, which serves as another information viewing apparatus among the plurality of information viewing apparatuses and which is currently inserted into another one of the plurality of slots, depending on a residual amount of a first battery provided in the first information viewing apparatus.

(2) According to another aspect of the present invention, in the management apparatus recited in item 1, the controlling section compares the residual amount of the first battery, provided in the first information viewing apparatus, with that of a second battery provided in the second information viewing apparatus, so as to move the data from the first information viewing apparatus to the second information viewing apparatus, when the residual amount of the second battery is greater than that of the first battery.

(3) According to still another aspect of the present invention, in the management apparatus recited in item 2, when plural information viewing apparatuses among the plurality of information viewing apparatuses correspond to the second information viewing apparatus, the controlling section moves the data to specific one of the plural information viewing apparatuses, in which the residual amount of the second battery is the greatest among those in the plural information viewing apparatuses corresponding to the second information viewing apparatus.

(4) According to still another aspect of the present invention, in the management apparatus recited in item 2, when other data has been stored in advance into the second information viewing apparatus, the controlling section moves the other data stored in the second information viewing apparatus to the first information viewing apparatus.

(5) According to still another aspect of the present invention, in the management apparatus recited in any one of items 1-4, when moving the data, the controlling section copies the data, stored in the first information viewing apparatus serving as a sender, into the second information viewing apparatus, serving as a moving destination apparatus, and then, deletes the data from the first information viewing apparatus serving as the sender.

(6) According to still another aspect of the present invention, the management apparatus, recited in any one of items 1-5, further comprises: a display section; wherein the controlling section makes the display section display information for notifying a user of the second information viewing apparatus to which the data is moved.

(7) According to still another aspect of the present invention, in the management apparatus recited in any one of items 1-5, the controlling section makes a display section, provided on the first information viewing apparatus, display information for notifying a user of the second information viewing apparatus to which the data is moved, thereon.

(8) According to a management system reflecting still another aspect of the present invention, the management system comprises: a plurality of information viewing apparatuses, each of which is activated by an electric power fed from a battery provided therein; and a management apparatus that includes a plurality of slots to support the plurality of information viewing apparatuses, each of which is to be inserted into each of the slots in a detachable manner, and a controlling section to control the plurality of information viewing apparatuses, respectively inserted into the slots; wherein, when a first information viewing apparatus, which serves as a predetermined information viewing apparatus among the plurality of information viewing apparatuses, is inserted into one of the plurality of slots, the controlling section moves data stored in the first information viewing apparatus to a second information viewing apparatus, which serves as another information viewing apparatus among the plurality of information viewing apparatuses and which is currently inserted into another one of the plurality of slots, depending on a residual amount of a first battery provided in the first information viewing apparatus; and wherein, when displaying a document based on the data, the first information viewing apparatus stores page information for specifying a latest page of the document, which is finally displayed on the first information viewing apparatus, and then, the management apparatus acquires the page information from the first information viewing apparatus, so as to transfer the page information to the second information viewing apparatus; and wherein, when displaying the document based on the data, the second information viewing apparatus refers to the page information so as to display the latest page of the document at first.

(9) According to a management method reflecting yet another aspect of the present invention, the management method to be employed in a system that comprises a plurality of information viewing apparatuses, each of which is activated by an electric power fed from a battery provided therein, and a management apparatus that includes a plurality of slots to support the plurality of information viewing apparatuses, each of which is to be inserted into each of the slots in a detachable manner, comprises: acquiring a residual amount of a first battery provided in a first information viewing apparatus, which serves as a predetermined information viewing apparatus among the plurality of information viewing apparatuses and which is currently inserted into one of the plurality of slots; and moving data stored in the first information viewing apparatus to a second information viewing apparatus, which serves as another information viewing apparatus among the plurality of information viewing apparatuses and which is currently inserted into another one of the plurality of slots, depending on a residual amount of a first battery provided in the first information viewing apparatus.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 shows a perspective view schematically indicating a configuration of a management system embodied in the present invention;

FIG. 10a and FIG. 10b show perspective views indicating exemplified configurations for notifying a user of an information viewing apparatus serving as a moving destination apparatus;

FIG. 11 shows a schematic diagram indicating an exemplified notification screen for notifying a user of an information viewing apparatus serving as a moving destination apparatus to which concerned data has been moved;

FIG. 13 shows a schematic diagram indicating an example of a management list to be stored into a management apparatus embodied in the present invention.

DETAILED DESCRIPTION OF THE PREFERRED EMBODIMENT

Figure 2:
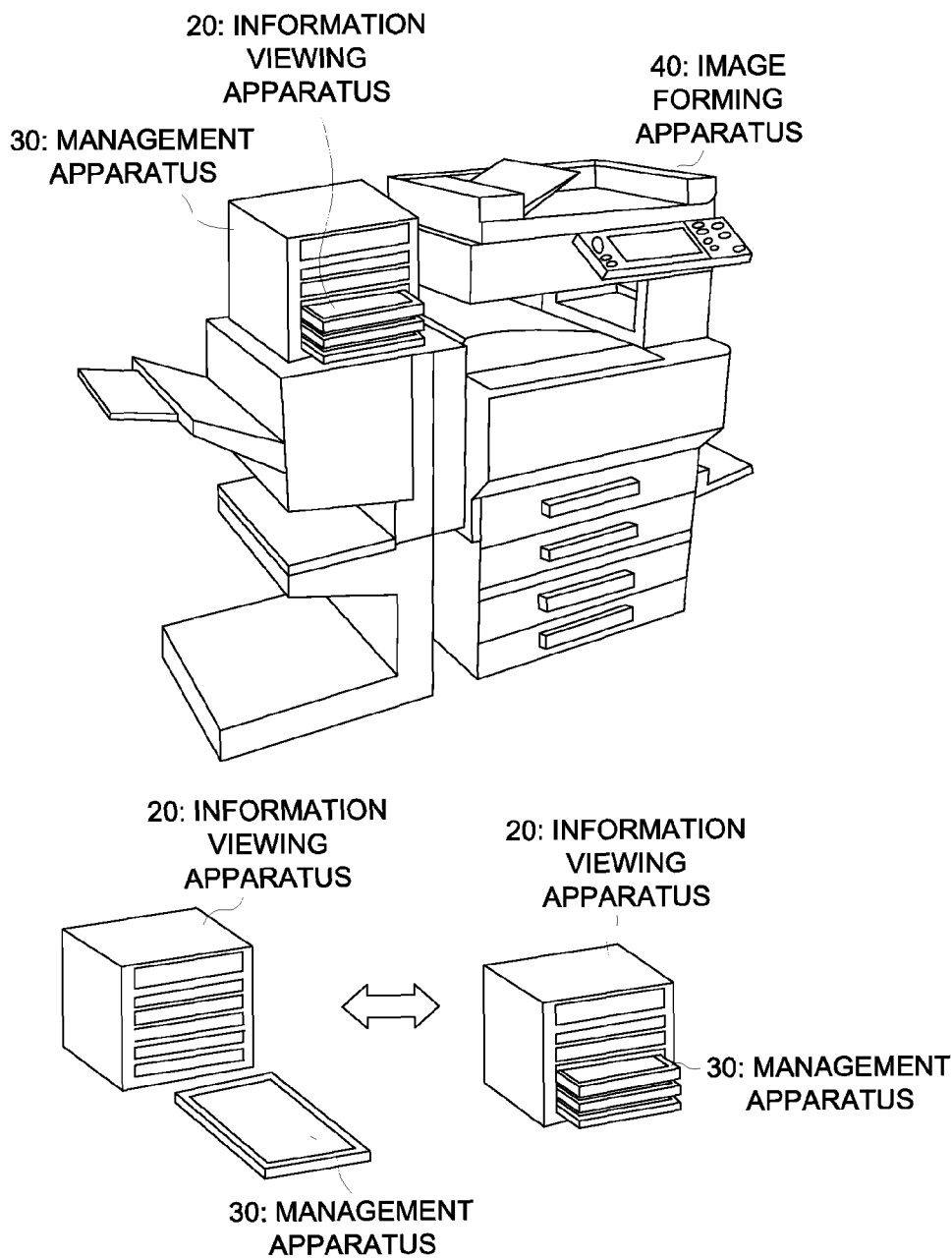
FIG. 2 shows a perspective view schematically indicating another configuration of a management system embodied in the present invention.

As described in the background of the invention, when the user employs such an apparatus that is driven by the electric power stored in a battery, such as the information viewing apparatus, for viewing information, the rundown of the battery causes not only the impossibility of viewing the information, but also the deletion of stored data. For this reason, the user should always gives attention to the residual amount of the battery while using the information viewing apparatus. As a result, there has arisen another problem that the user's usability is impaired.

To solve the abovementioned problem, according to one of the embodiments of the present invention, the management apparatus, which supports a plurality of information viewing apparatuses in detachable manner, conducts such a controlling operation that, when an information viewing apparatus is inserted (returned) into a slot, the management apparatus acquires the information in regard to the residual amount of electric power currently stored in the battery (hereinafter, also referred to as the residual amount of the battery, for simplicity) from the information viewing apparatus concerned, so as to move the data acquired from the concerned information viewing apparatus to another information viewing apparatus that is currently coupled to the management apparatus (for instance, an information viewing apparatus, the residual amount of the battery of which is greater than that of the information viewing apparatus concerned).

As abovementioned, even when the residual amount of electric power stored in the battery becomes short during the usage of the information viewing apparatus, by returning the concerned information viewing apparatus onto the management apparatus, the concerned data is moved to the other information viewing apparatus, which still stores a large amount of electric power in its battery. Accordingly, it becomes possible for the user to immediately use the other information viewing apparatus without waiting the completion of the battery charge, namely, it becomes possible to eliminate the waiting time for charging the battery. Therefore, it becomes possible for the user to use the information viewing apparatus without giving attention to the residual amount of the battery, resulting in improvement of the user's convenience and usability. In addition, since the charging state of the battery is improved (the battery is repeatedly recharged) every time when the information viewing apparatus is returned onto the management apparatus, it becomes possible to decrease the frequency of defect occurrences caused by the battery rundown occurring in mid-course of using the information viewing apparatus.

Further, the management apparatus also conducts such a controlling action that, at the time when moving the data, the management apparatus deletes the concerned data from the information viewing apparatus serving as the sender of the data, after copying the concerned data from the information viewing apparatus serving as the sender of the data to the other information viewing apparatus serving as the moving destination apparatus. Accordingly, it becomes possible to securely move the data without losing the data, even if a certain kind of defect occurs in mid-course of moving the data concerned.

Still further, the management apparatus also conducts such a controlling action that the management apparatus notifies the user of the other information viewing apparatus serving as the moving destination apparatus to which the concerned data has been moved. Accordingly, it becomes possible for the user to immediately find the other information viewing apparatus serving as the moving destination apparatus, and therefore, it becomes possible to prevent the system from deteriorating the working efficiency due to the data moving operation abovementioned.

Yet further, the management apparatus also conducts such a controlling action that the management apparatus transfers the page information, displayed on the information viewing apparatus serving as the sender of the data, to the other information viewing apparatus serving as the moving destination apparatus. Accordingly, it becomes possible for the user to immediately continue the current work, and therefore, it becomes possible to prevent the system from deteriorating the working efficiency due to the data moving operation abovementioned.

Embodiment

Figure 3:
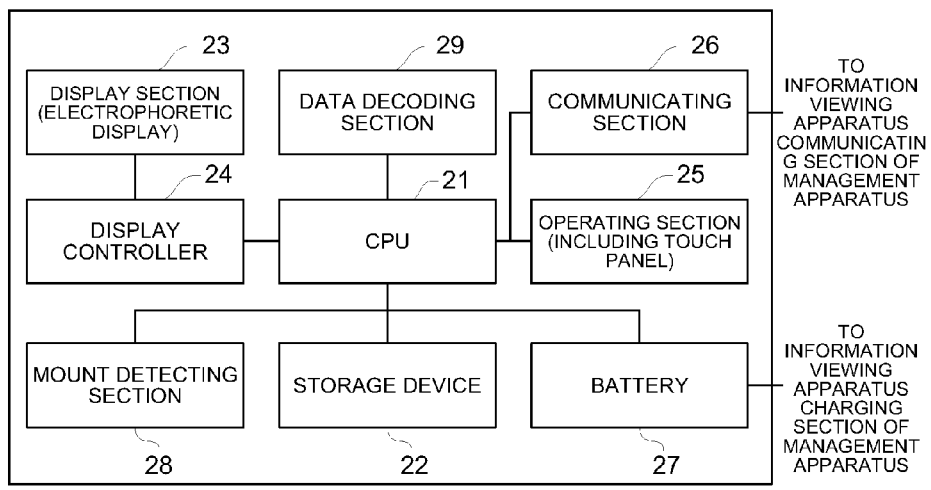
FIG. 3 shows a block diagram indicating a configuration of an information viewing apparatus embodied in the present invention.
Figure 4:
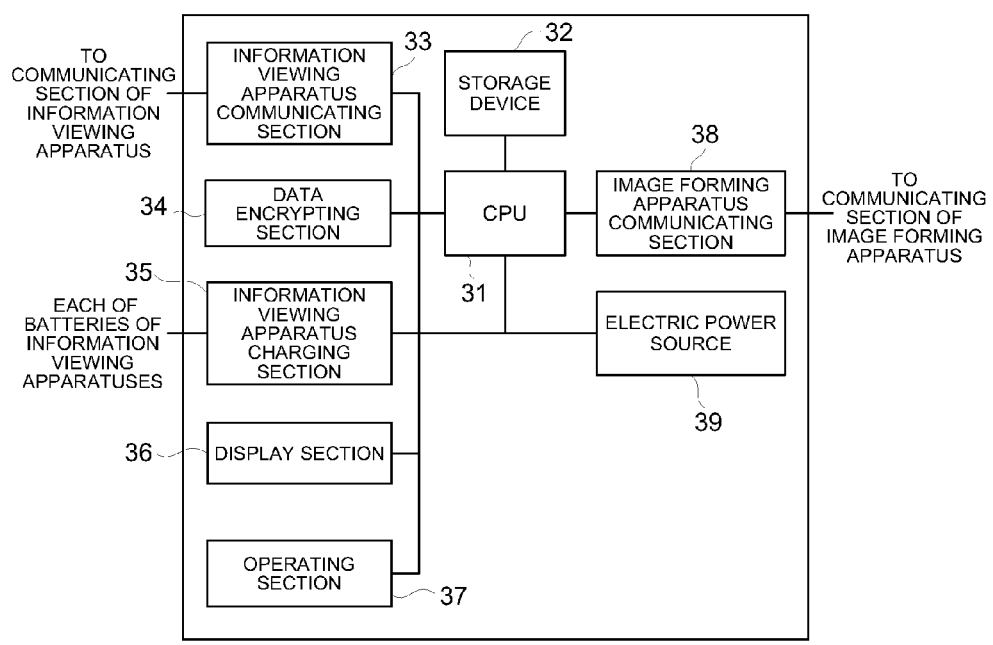
FIG. 4 shows a block diagram indicating a configuration of a management apparatus embodied in the present invention.

In order to further describe the preferred embodiment of the present invention in detail, referring to FIG. 1 through FIG. 13, a management apparatus, a management system and a managing method, embodied in the present invention, will be detailed in the following FIG. 1 and FIG. 2 show schematic diagrams indicating configurations of the management systems embodied in the present invention; FIG. 3 shows a block diagram indicating a configuration of the information viewing apparatus embodied in the present invention; and FIG. 4 shows a block diagram indicating a configuration of the management apparatus embodied in the present invention. Further, FIG. 5 through FIG. 8 show flowcharts indicating operations to be conducted in the management apparatus embodied in the present invention; and FIG. 9 shows a flowchart indicating operations to be conducted in the information viewing apparatus embodied in the present invention. Still further, FIG. 10*a* shows a perspective view indicating a state of mounting a plurality of information viewing apparatuses, each of which is provided with an LED (Light Emitting Diode) indicator, into the management apparatus, while FIG. 10*b* show a perspective view indicating another state of mounting a plurality of information viewing apparatuses into the management apparatus, which is provided with a plurality of LED indicators, respectively corresponding to the information viewing apparatuses. Still further, FIG. 11 shows a schematic diagram indicating an exemplified notification screen for notifying the user of the information viewing apparatus serving as a moving destination apparatus to which the data has been moved; FIG. 12*a* through FIG. 12*d* show schematic diagrams indicating various kinds of exemplified ID (IDentification) display sections; and FIG. 13 shows a schematic diagram indicating an example of a management list.

As indicated in the schematic diagrams shown in FIG. 1 and FIG. 2, a management system 10, embodied in the present invention, is constituted by a plurality of information viewing apparatuses 20, a management apparatus 30 that supports the plurality of information viewing apparatuses 20 in detachable manner, and a processing apparatus (in the present embodiment, an image forming apparatus 40 serves as the processing apparatus) that transmits the electric data to the management apparatus 30.

In this connection, although the image forming apparatus 40 is exemplified as the processing apparatus in the present embodiment, any kind of apparatus, for instance, a client computer terminal device that creates the electric data representing a document, a server that stores the electric data, etc., is applicable as the processing apparatus defined in the present invention, as far as the concerned apparatus can handle the electric data representing an image to be displayed on the information viewing apparatuses 20. Each of the apparatuses constituting the management system 10 will be detailed in the following.

<Information Viewing Apparatus>

The information viewing apparatus 20 is such an apparatus that is provided with a storage section, and specifically, such an apparatus that is provided with both a storage section and a display section, such as an electronic paper sheet, an electronic book, etc., and as shown in FIG. 3, the information viewing apparatus 20 is constituted by a CPU (Central Processing Unit) 21, a storage device 22, a display section (electronic paper sheet) 23, a display controller 24, an operating section (touch panel) 25, a communicating section 26, a battery 27, a mount detecting section 28, a data decoding section 29, etc.

The CPU 21 executes various kinds of programs read from the storage device 22 so as to control the operations to be conducted in the various kinds of sections. The storage device 22 is constituted by a ROM (Read Only Memory), a RAM (Random Access Memory), etc., so as to store the various kinds of programs to be executed by the CPU 21, setting information for controlling the operations to be conducted by the information viewing apparatus 20, electric data representing images to be displayed onto the display section 23, information for specifying the pages of the image to be displayed, etc. Further, the CPU 21 and the storage device 22 constitute a controlling section.

The display section 23 is constituted by an electronic paper sheet, serving as an EPD (ElectroPhoretic Display or Electrophoretic Display) in which the displaying action is achieved by the motion of dispersed particles relative to a transparent fluid under the influence of a spatially uniform electric field, a LCD (Liquid Crystal Display), an Organic EL (Electro-Luminescence), etc., so as to display an image based on the electric data (for instance, a conference material), ID (IDentification) information of the user who is currently using the information viewing apparatus 20, which are transmitted from the management apparatus 30, thereon. Further, it is also applicable that the system is so constituted that, in addition to the display section 23 serving as the main display, the information viewing apparatuses 20 is further provided with an ID display section to display the ID (IDentification) information of the user who uses the information viewing apparatus 20 (refer to the schematic diagram shown in FIG. 12b), and/or an indicator to notify the user of the fact that the data is moved to the information viewing apparatus 20 currently indicated by indicator (for instance, an LED (Light Emitting Diode) indicator indicated in the schematic diagram shown in FIG. 10a, or the like), as needed.

The display controller 24 drives the display section 23, and controls the operations for displaying and erasing images to be displayed on the screen. Further, the display controller 24 also conducts the controlling operation for displaying the ID information of the user who is currently using the information viewing apparatuses 20, etc., within a predetermined area of the display section 23 (located at a position being viewable from a direction straightly opposing to the display section 23).

The operating section 25 is constituted by buttons, switches, a pressure sensitive touch panel in which transparent electrodes are arranged in a lattice pattern, etc., which are mounted on the display section 23. The pressure sensitive touch panel detects X and Y coordinate values at the pressed point selectively depressed by a finger, a touch pen, etc., as voltage values, so as to output the detected positional signals to the CPU 21 as the operational signals.

The communicating section 26 serves as an interface for coupling the information viewing apparatus 20 to the management apparatus 30, and establishes the communication with the management apparatus 30 by employing a wired communication, a wireless communication, an infrared communication, a Bluetooth (Registered Trade Mark) communication, etc.

The battery 27 can be recharged by electric power supplied from an information-viewing apparatus charging section, so as to supply electric power to each of the sections provided in the information viewing apparatus 20.

The mount detecting section 28 detects a status of inserting or removing the information viewing apparatus 20 into/from the management apparatus 30. The scope of the detecting method applicable in the present invention is not specifically limited. For instance, it is possible to detect the mounting status by determining whether or not the battery 27 is coupled to the information-viewing apparatus charging section of the management apparatus 30, or it is also possible to detect the mounting status by determining whether or not an electrode attached to the information viewing apparatus 20 is electrically coupled to another electrode attached to the management apparatus 30, or an electric contact point, which is turned ON or OFF by applying or removing the self weight of the information viewing apparatus 20, is disposed at the bottom section of the information viewing apparatus 20, so as to make it possible to detect the mounting status by determining whether the electric contact point is turned ON or OFF.

When the electric data, transmitted from the image forming apparatus 40 to the information viewing apparatus 20 through the management apparatus 30, is encrypted, the data decoding section 29 applies any one of various kinds of conversion processing to the electric data, so as to convert the electric data to processed data, being displayable by the display section 23.

In this connection, although the display controller 24, the mount detecting section 28 and the data decoding section 29 are configured as hardware in the exemplified configuration shown in FIG. 3, it is also applicable that those are configured as software programs to be executed by the controlling section (CPU 21).

<Management Apparatus>

The management apparatus 30 is provided with a function for physically supporting the information viewing apparatus 20, another function for implementing the data communication with the information viewing apparatus 20, still another function for recharging the battery 27 provided in the information viewing apparatus 20, and is fixed onto the main frame of the image forming apparatus 40 or the attachment thereof (for instance, a paper sheet feeding section, a post processing section, etc.).

The management apparatus 30 is structured in such a manner that the information viewing apparatus 20 can be inserted or removed into/from the management apparatus 30. For instance, as indicated in the schematic diagrams shown in FIG. 1 and FIG. 2, the management apparatus 30 is formed in a cubic shape and is provided with a plurality of slots, into each of which each of information viewing apparatuses 20 can be inserted and supported in an erect state or a laying state. In this connection, although the shapes of the information viewing apparatuses 20, indicated in the schematic diagrams shown in FIG. 1 and FIG. 2, are the same as each other, it is applicable that the shapes of the information viewing apparatuses 20 are different from each other, and accordingly, it is applicable that the shapes of the slots are also different from each other, so as to make it possible to support the information viewing apparatuses 20, the shapes of which are different from each other.

Further, as shown in FIG. 4, the management apparatus 30 is provided with a CPU (Central Processing Unit) 31, a storage device 32, an information viewing apparatus communicating section 33, a data encrypting section 34, the information viewing apparatus charging section 35, an image forming apparatus communicating section 38 and an electric power source 39, and further provided with a display section 36, an operating section 37, etc., as needed.

The CPU 31 executes various kinds of programs read from the storage device 32 so as to control the operations to be conducted in the various kinds of sections. The storage device 32 is constituted by a ROM (Read Only Memory) and a RAM (Random Access Memory), so as to store the various kinds of programs to be executed by the CPU 31, setting information for controlling the operations to be conducted by the management apparatus 30, various kinds of electric data representing images to be displayed on the information viewing apparatus 20, a management list detailed later, etc., therein. Further, the CPU 31 and the storage device 32 constitute a controlling section. Concretely speaking, when the information viewing apparatus 20 is inserted (returned) into the slot, the controlling section conducts such the controlling operations for: acquiring the information in regard to the residual amount of the battery of the information viewing apparatus 20 concerned; moving the data acquired from the information viewing apparatus concerned to the other information viewing apparatus 20, corresponding to the residual amount of the battery above-acquired; notifying the user of information in regard to the other information viewing apparatus 20, serving as the moving destination apparatus to which the data has moved; notifying the other information viewing apparatus 20 of the information in regard to the pages that have been viewed on the information viewing apparatuses 20 concerned; etc.

The information viewing apparatus communicating section 33 serves as an interface for coupling a single set of information viewing apparatus 20 or a plurality of the information viewing apparatuses 20 to the management apparatus 30, and establishes the communication with each of the information viewing apparatuses 20 by employing a wired communication, a wireless communication, an infrared communication, a Bluetooth (Registered Trade Mark) communication, etc. In addition to above, the information viewing apparatus communicating section 33 acquires information in regard to a presence or absence of data in the storage device 22, the user who uses the data concerned, a latest date and time when the operations for writing the data, moving the data, deleting the data, etc., have been conducted (the latest accessing date-and-time), from each of the information viewing apparatuses 20, so as to notify the CPU 31 of the above-acquired information.

The data encrypting section 34 encrypts the electric data acquired from the image forming apparatus 40, as needed.

The information viewing apparatus charging section 35 supplies electric power, outputted by the electric power source 39, to the battery 27 of each of the information viewing apparatuses 20 concerned, so as to recharge the battery 27. On that occasion, the information viewing apparatus charging section 35 measures the electric charge amount (residual amount of the battery) from the output voltage of the battery 27 concerned, so as to notify the CPU 31 of the measured result. In addition, the information viewing apparatus charging section 35 also detects the fact that the information viewing apparatus 20 is inserted into the management apparatus 30, so as to notify the CPU 31 of the date and time when the information viewing apparatuses 20 has been inserted, and the related information.

The display section 36 is constituted by a LCD (Liquid Crystal Display), an Organic EL (Electro-Luminescence) display device, etc., and is disposed at a predetermined position of the management apparatus 30 (for instance, at a front surface, a side section of each of the slots, etc.), so as to display the information for notifying the user of the other information viewing apparatus 20 to which the data has been moved, the ID information of the user who is currently using the information viewing apparatuses 20, etc. Further, it is also applicable that the system is so constituted that, in addition to the display section 36 serving as the main display, the management apparatus 30 is further provided with an ID display section to display the ID information of the user who uses the information viewing apparatus 20 (refer to the schematic diagram shown in FIG. 12d), and/or an indicator to notify the user of the fact that the data is moved to the information viewing apparatus 20 currently indicated by indicator (for instance, an LED indicator indicated in the schematic diagram shown in FIG. 10b, or the like), as needed.

The operating section 37 is constituted by buttons, switches, a pressure sensitive touch panel in which transparent electrodes are arranged in a lattice pattern, etc., which are mounted on the display section 36. The pressure sensitive touch panel detects X and Y coordinate values at the pressed point selectively depressed by a finger, a touch pen, etc., as voltage values, so as to output the detected positional signals to the CPU 31 as the operational signals.

The image forming apparatus communicating section 38 serves as an interface for coupling the management apparatus 30 to the image forming apparatus 40, and establishes the communication with the image forming apparatus 40 by employing a wired communication, a wireless communication, an infrared communication, a Bluetooth (Registered Trade Mark) communication, etc.

The electric power source 39 supplies electric power to various kinds of sections included in the management apparatus 30, so as to activate them.

In this connection, although the management apparatus 30 is provided with the display section 36 and operating section 37 in the configuration thereof, indicated in the block diagram shown in FIG. 4, it is also applicable that the management apparatus 30 is not provided with the display section 36 and/or the operating section 37.

<Image Forming Apparatus>

For instance, the image forming apparatus 40, serving as an example of the processing apparatus embodied in the present invention, is provided with a controlling section, a communicating section, an ADF (Automatic Document Feeder), an image reading section, a display section, an operating section, a paper sheet feeding section, a printing section, a post processing section, etc.

The controlling section is constituted by a CPU (Central Processing Unit) and various kinds of storage devices, such as a ROM (Read Only Memory), RAM (Random Access Memory), etc. The controlling section makes the printing section implement the printing operations, based on the print data acquired from the computer apparatus or the like, which is coupled to the image forming apparatus 40 through the communication network, or the electric data, such as image data read by the image reading section, etc. Further, the controlling section transmits the electric data, to which the ID information of the concerned user is attached in advance, to the management apparatus 30, or attaches the ID information of the concerned user to the electric data, and then, transmits the electric data attached with the ID information to the management apparatus 30.

The communicating section serves as an interface for coupling the image forming apparatus 40 to the management apparatus 30, and establishes the communication with the management apparatus 30 by employing a wired communication, a wireless communication, an infrared communication, a Bluetooth (Registered Trade Mark) communication, etc.

The ADF automatically feeds a single sheet of a document or plural sheets of a document into the image reading section.

The image reading section optically reads an image residing on a document paper sheet placed on the document placing plate, and is constituted by a light source that emits a light beam to be scanned onto the document paper sheet, a CCD (Charge Coupled Device) image sensor that converts the light reflected from the document paper sheet to electric signals, an analogue to digital converter that converts the electric signals to digital image data, etc.

The display section is constituted by a LCD (Liquid Crystal Display), an Organic EL (Electro-Luminescence) display device, etc., and displays a screen for operating the image forming apparatus 40, another screen for allotting the data to each of the information viewing apparatuses 20, etc. Further, the operating section is constituted by buttons, switches, so as to make it possible to input various kinds of settings and instructions, therefrom. In this connection, it is applicable that the display section and the operating section are configured as either separate devices or an integrated device that includes a pressure sensitive touch panel mounted over the display section, in which transparent electrodes are arranged in a lattice pattern.

The paper sheet feeding section is constituted by a plurality of paper sheet accommodating trays, into which paper sheets having various kinds of sheet sizes are respectively accommodated, so as to feeds the accommodated paper sheets to the printing section.

The printing section is constituted by various kinds of functional constituents, being necessary for implementing the image forming operation, which employs an image forming process, such as the electro-photographic process, the electrostatic recording process or the like, for instance, a photoreceptor drum, a transferring belt, a fixing device, various kinds of conveyance belts, etc. Further, based on the print data or the image data, the printing section forms an image onto the paper sheet designated by the user, and then, conveys the paper sheet with the fixed image to the post processing section.

Under the instruction commands issued by the controlling section, the post processing section applies a post processing desired by the user, such as a punch processing, a staple processing, a book bind processing, etc., to the paper sheet conveyed from the printing section, and then, outputs the processed paper sheet.

Incidentally, the scope of the configuration of the image forming apparatus 40 is not specifically limited, as far as the image forming apparatus 40 is provided with at least a function for communicating data with the management apparatus 30 and a physical space within which the management apparatus 30 is mountable.

Further, although, according to the configurations shown in FIG. 1 and FIG. 2, the management system 10 is constituted by the information viewing apparatuses 20, the management apparatus 30 and the processing apparatus (image forming apparatus 40), in such a case that it is not necessary to transmit the electric data from the processing apparatus to the management apparatus 30, for instance, when the electric data is stored in advance into the information viewing apparatuses 20 or the management apparatus 30, it is applicable that the management system 10 is constituted by the information viewing apparatuses 20 and the management apparatus 30 only, or the management system 10 is further includes such an apparatus that provides the electric data to the processing apparatus, (for instance, a computer apparatus that transmits the print data written in the Page Description Language, such as the PCL (Printer Control Language), the PS (Post Script), etc.), a relay apparatus that couples the information viewing apparatuses 20 to the management apparatus 30 and/or the processing apparatus through the communication network.

Referring to the flowchart shown in FIG. 5, the processing operations, which are to be conducted by the management apparatus 30 when the information viewing apparatus 20 is inserted (returned) into the management apparatus 30, will be detailed in the following.

In this connection, in the explanations to be provided in the following, it is assumed that the management list shown in FIG. 13 is stored in the storage device 32 of the management apparatus 30 in advance. This management list is filled with the descriptions in regard to a slot number, a status, a charged electric amount (residual amount of the battery) and a latest accessing data and time. The controlling section (CPU 31) creates the management list on the basis of the information acquired from the information viewing apparatus 20 through the information viewing apparatus communicating section 33 and/or detected by the information viewing apparatus charging section 35.

For instance, as shown in FIG. 13, the column of status corresponding to each of the slot numbers: is kept as a blank space when the information viewing apparatus 20 is not mounted on the slot concerned; is filed with the "vacant" (no data is stored) when the information viewing apparatuses 20, in which no data is stored, is mounted on the slot concerned; or is filled with the "user's ID" when the information viewing apparatus 20, in which the information in regard to the user is stored. Further, the charged electric amount represents the current charged status of the information viewing apparatus 20, coupled to the slot concerned, in the percentage value of the current charged amount versus the fully charged amount. Still further, the column of the latest accessing data and time is filled with the latest date and time when the operations for writing moving and deleting the data have been conducted at last (when the information viewing apparatus 20 is mounted, the concerned date and time).

The contents of the management list is to be updated every time when the operations for writing, moving and deleting the data are conducted, every time when the information viewing apparatus 20 is removed from the management apparatus 30, or every time when the information viewing apparatus 20 is newly mounted onto the management apparatus 30. However, the column of the charged electric amount is always updated, corresponding to the current status thereof.

Initially, when the user returns the information viewing apparatus 20 onto the management apparatus 30, the controlling section (CPU 31) confirms whether or not the information viewing apparatus 20 should be continuously employed (Step S101). In this connection, it is applicable that the user operates the operating section 25 of the information viewing apparatus 20 in advance, or operates the operating section 37 of the management apparatus 30 at the time of returning to determine whether or not the information viewing apparatus 20 should be continuously employed.

When confirming that the information viewing apparatus 20 should not be continuously employed (Step S101; No), the controlling section (CPU 31) finalizes the processing, and then, implements the operation for charging the battery 27. On the other hand, when confirming that the information viewing apparatus 20 should be continuously employed (Step S101; Yes), the controlling section (CPU 31) acquires the information in regard to the residual amount of the battery from the management list (Step S102), so as to determine whether or not the above-acquired residual amount of the battery is equal to or lower than a prescribed value determined in advance (Step S103). This prescribed value can be established by taking a capacity and an electric power consumption of the battery 27 provided in the information viewing apparatus 20, an average usage time for each employment of the information viewing apparatus 20, etc., into account. For instance, it is possible to establish the prescribed value at 50% of the full charged amount thereof.

When determining that the residual amount of the battery is greater than the prescribed value (Step S103; No), the controlling section (CPU 31) finalizes the processing since the information viewing apparatus 20 can be employed as it is. In this connection, although the present embodiment is so constituted that the controlling section (CPU 31) determines whether or not the residual amount of the battery of the information viewing apparatus 20, currently returned, is equal to or lower than the prescribed value, it is also applicable that the system is so constituted that, even when the residual amount of the battery of the information viewing apparatus 20, currently returned, exceeds the prescribed value, the controlling section (CPU 31) implements the operation for moving the data to the other information viewing apparatus 20, irrespective of whether or not the residual amount of the battery is equal to or lower than the prescribed value, since it becomes possible to use the data for longer time by moving the data to the other information viewing apparatus 20 whose residual amount of the battery is greater than that of the information viewing apparatus 20, currently returned (namely, the determining step in Step S103 is omitted).

On the other hand, when determining that the residual amount of the battery is equal to or lower than the prescribed value (Step S103; No), the controlling section (CPU 31) selects the other information viewing apparatus 20 serving as the data moving destination, to which the data is to be moved, from the information viewing apparatuses 20 currently mounted onto the management apparatus 30 (Step S104). Referring to the flowchart shown in FIG. 6, the operations to be conducted in Step S104 will be detailed in the following.

At first, referring to the management list stored in storage device 32 in advance, the controlling section (CPU 31) determines whether or not a single information viewing apparatus 20 or plural information viewing apparatuses 20, the residual amount of the battery of which is/are greater than that of the information viewing apparatus 20 currently returned (hereinafter, referred to as candidate information viewing apparatuses 20), exists/exist (Step S201). When determining that none of the candidate information viewing apparatuses 20 exist (Step S201; No), since it is nonsense to move the data, the controlling section (CPU 31) determines that no moving destination exists (Step S213), and finalizes the processing.

On the other hand, when determining that the candidate information viewing apparatuses 20 exist (Step S201; Yes), the controlling section (CPU 31) further determines whether or not vacant information viewing apparatuses 20 (no data is stored in the storage device 22 thereof) exist among them (Step S202). In this connection, the reason, why the controlling section determines whether or not vacant information viewing apparatuses 20 exists, lays on the fact that it sometimes become undesirable that, since an information viewing apparatus 20, in which the data is stored, is currently employed by the other user, if the data is moved to the information viewing apparatus 20 concerned, the other user is obliged to use an information viewing apparatus 20 in which the residual amount of the battery becomes low. However, it is possible to omit the determining operation in Step S202, since the user who has returned the information viewing apparatus 20 can employ such an information viewing apparatus 20 that stores a large residual amount of the battery even if the data has been moved irrespective of whether or not vacant information viewing apparatuses 20 exist, and since the other user can employ such an information viewing apparatus 20 that stores a large residual amount of the battery by again returning the information viewing apparatus 20.

Successively, when determining that the vacant information viewing apparatuses 20 exist (Step S202; Yes), the controlling section (CPU 31) determines whether or not information viewing apparatuses 20 that have completed the charging operation exist among them (Step S203).

When determining that an information viewing apparatus 20 that has completed the charging operation exists among the vacant information viewing apparatuses 20 in the storage device 22 of each of which no data is stored (Step S203; Yes), the controlling section (CPU 31) determines the information viewing apparatus 20 concerned as the data moving destination apparatus (Step S204). In this connection, when a plurality of information viewing apparatuses 20 is determined as the data moving destination apparatuses, any one of them can be selected as the data moving destination apparatus to be actually employed.

On the other hand, when determining that an information viewing apparatus 20 that has completed the charging operation does not exist among the vacant information viewing apparatuses 20 in the storage device 22 of each of which no data is stored (Step S203; No), the controlling section (CPU 31) further determines whether or not an information viewing apparatus 20 whose residual amount of the battery is equal to or greater than a prescribed value determined in advance exists among them (Step S205). This prescribed value may be either the same value as indicated in Step S103 of the flowchart shown in FIG. 5, or the different value from the prescribed value indicated in Step S103 (for instance, such a value that is larger than the prescribed value indicated in Step S103, in order to change the currently returned one to another information viewing apparatus 20 whose residual amount of the battery is greater than that of the currently returned one). In this connection, although the controlling section (CPU 31) determines whether or not an information viewing apparatus 20 whose residual amount of the battery is equal to or greater than the prescribed value exists in the present embodiment, it is possible to omit the determining operation in Step S205, since it is possible for the user to view the images represented by the data and displayed onto even such an information viewing apparatus 20, the residual amount of the battery of which is lower than the prescribed value, but greater than that of the information viewing apparatus 20 currently returned, for long time by changing the information viewing apparatus 20 to the other one.

Still successively, when determining that the information viewing apparatus 20 whose residual amount of the battery is equal to or greater than the prescribed value does not exist (Step S205; No), the controlling section (CPU 31) determines that no moving destination exists (Step S213), and finalizes the processing. On the other hand, when determining that information viewing apparatuses 20 whose residual amounts of the battery are equal to or greater than the prescribed value exist (Step S205; Yes), the controlling section (CPU 31) finds a specific information viewing apparatus 20 whose residual amount of the battery is the greatest among them (Step S206), so as to select the specific information viewing apparatus 20 as the moving destination apparatus (Step S207).

In this connection, although the controlling section (CPU 31) determines whether or not information viewing apparatuses 20 that have completed the charging operation exist in Step S203 of the present embodiment, it is possible to omit the determining operation in Step S203, since the information viewing apparatus 20 that have completed the charging operation is selected even by implementing the processing operations in Step S205 through Step S207 without implementing the determining operation in Step S203.

Successively, when determining that a vacant information viewing apparatus 20, into the storage device 22 of which no data is stored, does not exist among the candidate information viewing apparatuses 20 concerned (Step S202; No), the controlling section (CPU 31) further determines whether or not an information viewing apparatus 20 whose residual amount of the battery is equal to or greater than the prescribed value exists among them (Step S208). When determining that the information viewing apparatus 20 whose residual amount of the battery is equal to or greater than the prescribed value does not exist, the controlling section (CPU 31) determines that no moving destination exists (Step S213), and finalizes the processing. In this connection, even in the abovementioned case, although the controlling section (CPU 31) determines whether or not an information viewing apparatus 20 whose residual amount of the battery is equal to or greater than the prescribed value exists in the present embodiment, it is also possible to omit the determining operation in Step S208, since it is possible for the user to view the images represented by the data and displayed onto even such an information viewing apparatus 20, the residual amount of the battery of which is lower than the prescribed value, but greater than that of the information viewing apparatus 20 currently returned, for long time by changing the information viewing apparatus 20 to the other one.

When determining that information viewing apparatuses 20 whose residual amounts of the battery are equal to or greater than the prescribed value exist (Step S208; Yes), the controlling section (CPU 31) finds a specific information viewing apparatus 20 whose latest accessing time is the oldest among them (Step S209). In this connection, the reason, why the controlling section finds a specific information viewing apparatus 20 whose latest accessing time is the oldest among them, lays on the fact that an information viewing apparatus 20, into the storage device 22 of which the data is stored, is currently employed by the other user, and the possibility that the other user continuously employs the information viewing apparatus 20 whose latest accessing time is the newest among them is high.

Successively, the controlling section (CPU 31) further determines whether or not the data exchanging operation is possible in the specific information viewing apparatus 20 whose latest accessing time is the oldest (Step S210). In this connection, the reason, why the controlling section determines whether or not the data exchanging operation is possible, lays on the fact that there sometimes occurs such a case that, since the method for once copying the data, and then, deleting the data concerned is employed as the data moving method in the present embodiment, when the vacant capacity of the storage device 22 of the information viewing apparatus 20 concerned is smaller than the size of data to be moved, it is impossible to exchange the data concerned.

Still successively, when determining that the data exchanging operation is possible (Step S210; Yes), the controlling section (CPU 31) selects the specific information viewing apparatus 20 as the moving destination apparatus (Step S212). On the other hand, when determining that the data exchanging operation is impossible (Step S210; No), the controlling section (CPU 31) further determines whether or not a next specific information viewing apparatus 20 whose latest accessing time is the oldest next to that of the specific information viewing apparatus 20 exists among them (Step S211). When determining that the next specific information viewing apparatus 20 exists (Step S211; Yes), the controlling section (CPU 31) returns to Step S210 so as to determine whether or not the data exchanging operation is possible in the next specific information viewing apparatus 20. When determining that the next specific information viewing apparatus 20 does not exist (Step S211; No), the controlling section (CPU 31) determines that no moving destination exists (Step S213), and finalizes the processing.

Figure 5:
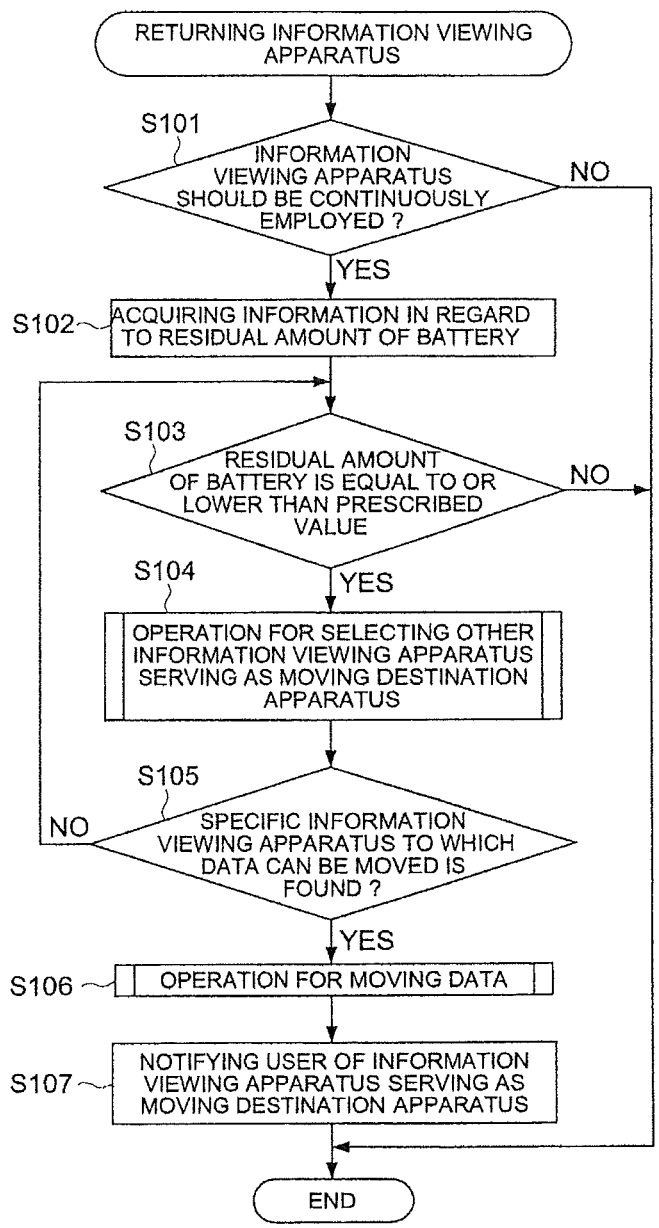
FIG. 5 shows a flowchart indicating operations (in regard to a processing when information viewing apparatus has been returned) to be conducted in a management apparatus embodied in the present invention.
Figure 6:
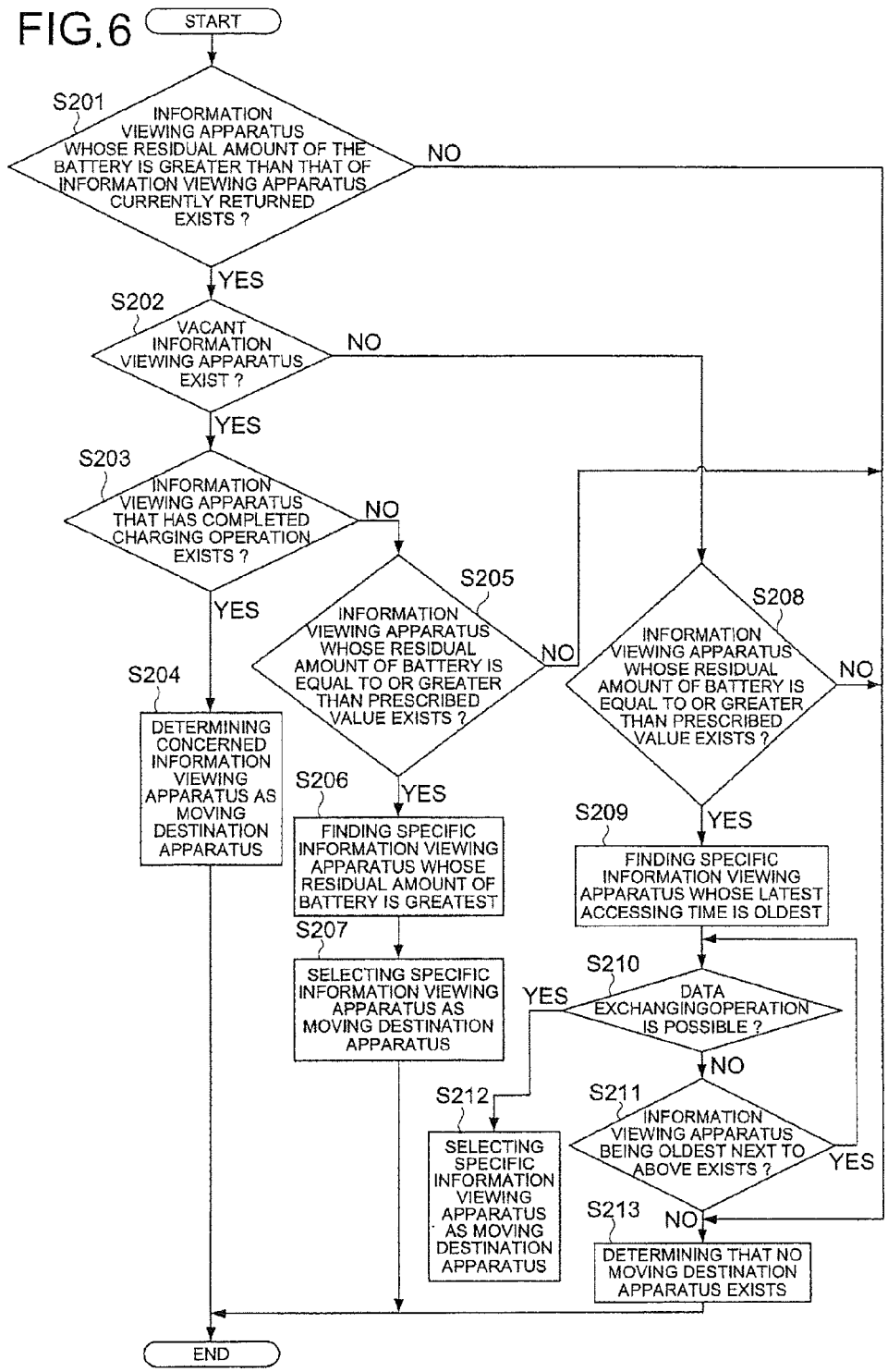
FIG. 6 shows a flowchart indicating operations (in regard to a selection processing of an information viewing apparatus serving as a moving destination apparatus) to be conducted in a management apparatus embodied in the present invention.
Figure 7:
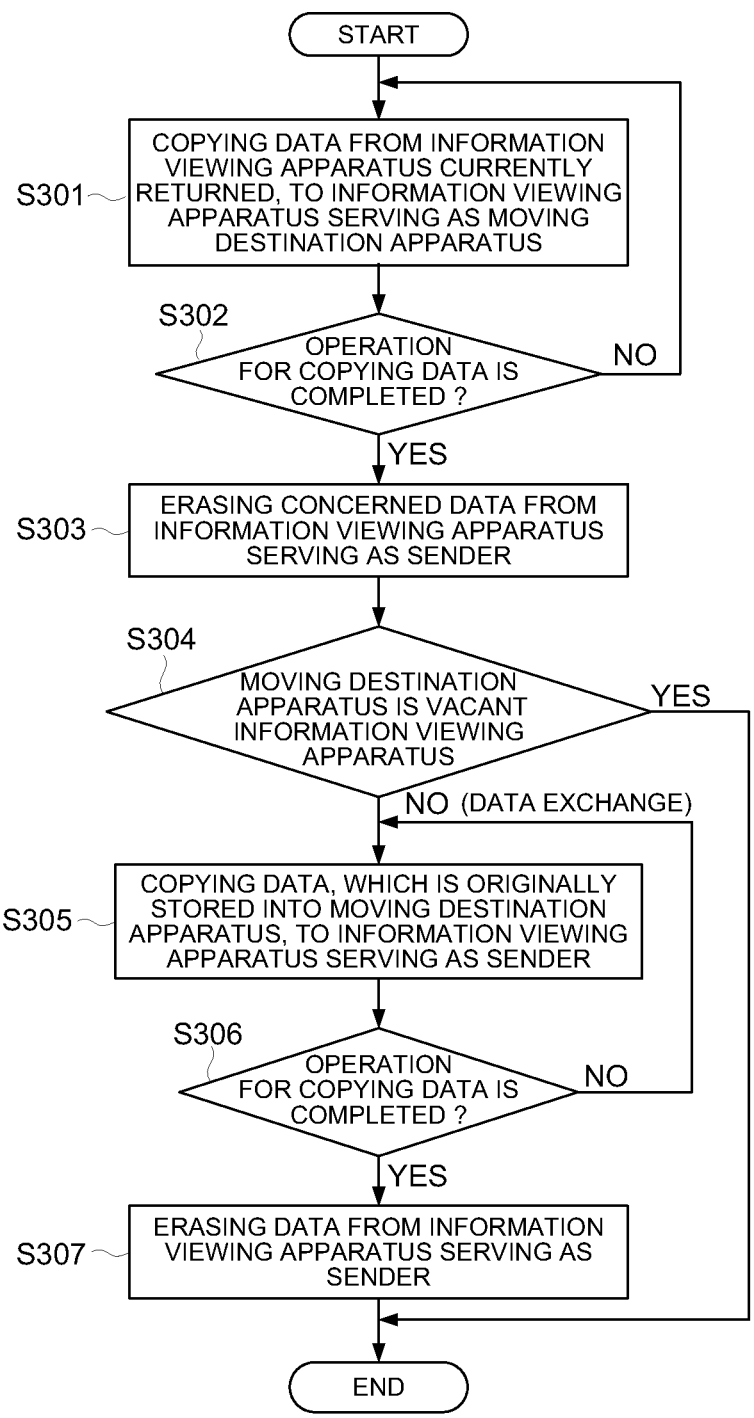
FIG. 7 shows a flowchart indicating operations (in regard to a moving processing of data) to be conducted in a management apparatus embodied in the present invention.

Returning to the flowchart shown in FIG. 5, the controlling section (CPU 31) determines whether or not the specific information viewing apparatus 20 to which the data can be moved is found (Step S105). When determining that the specific information viewing apparatus 20 to which the data can be moved does not exist (namely, neither the specific one whose residual amount of the battery is greater than that of the information viewing apparatus 20 currently returned, nor the specific one whose residual amount of the battery is greater than the prescribed value, exists) (Step S105; No), the controlling section (CPU 31) returns to Step S103, so as to repeat this operational loop until either the information viewing apparatus 20 currently returned, or any one of the other information viewing apparatuses 20 currently coupled to the management apparatus 30, has been sufficiently charged, or an information viewing apparatus 20 whose residual amount of the battery is sufficiently large has been returned onto the management apparatus 30.

Successively, when determining that the specific information viewing apparatus 20 to which the data can be moved exists (Step S105; Yes), the controlling section (CPU 31) moves the data, stored in the information viewing apparatus 20 currently returned, to the specific information viewing apparatus 20 selected in Step S104 (Step S106). Referring to the flowchart shown in FIG. 7, the processing operations to be conducted in Step S106 will be detailed in the following.

At first, the controlling section (CPU 31) copies the data stored in the storage device 22 of the information viewing apparatus 20, currently returned, to the specific information viewing apparatus 20 (selected in Step S104) serving as the moving destination apparatus (Step S301). Then, at the time when determining that the operation for copying the data is completed (Step S302; Yes), the controlling section (CPU 31) erases the concerned data from the storage device 22 of the information viewing apparatus 20 serving as the sender (Step S303).

In this connection, the reason, why the data is erased after copying the data, instead of taking out the data from the sender (namely, erasing the data) and pasting the data onto the moving destination apparatus, is to prevent the sender from losing the data even in such the case that the information viewing apparatus 20 to be served as the moving destination apparatus happens to be pulled out from the management apparatus 30 in mid course of moving the data, the power source of the management apparatus 30 is abruptly turned OFF, or the power source is cut OFF due to the blackout of the electric supply, etc. Further, the reason, why the data is directly moved from the sender to the moving destination apparatus, is to make it possible to move the data even when the storage capacity of the storage device 32 of the management apparatus 30 is small.

Successively, controlling section (CPU 31) determines whether or not the moving destination apparatus is the vacant information viewing apparatus 20 (namely, whether or not the information viewing apparatus 20 serving as the moving destination apparatus originally stores data therein) (Step S304). When determining that the moving destination apparatus is the vacant information viewing apparatus 20, the controlling section (CPU 31) finalizes the processing (END). On the other hand, when determining that the moving destination apparatus is not the vacant information viewing apparatus 20, the controlling section (CPU 31) copies the data, which is originally stored into the information viewing apparatus 20 serving as the moving destination apparatus, into the information viewing apparatus 20 serving as the sender (Step S305). Completing the copying operation (Step S306; Yes), the controlling section (CPU 31) deletes (erases) the data from the information viewing apparatus 20 serving as the sender (Step S307).

In this connection, as well as the above, the reason, why the data is erased after copying the data, instead of taking out the data from the sender and pasting the data onto the moving destination apparatus, is to prevent the sender from losing the data even in such the case that an unexpected problem has occurred in mid course of moving the data. Further, the reason, why the data is directly moved between the information viewing apparatuses 20, is to make it possible to move the data even when the storage capacity of the storage device 32 of the management apparatus 30 is small.

Further, although the present embodiment employs such the procedure that, after the data stored in the information viewing apparatus 20 serving as the sender (information viewing apparatus 20 currently returned) has been moved to the information viewing apparatus 20 serving as the moving destination apparatus (information viewing apparatus 20 selected in Step S104), the data originally stored in the information viewing apparatus 20 serving as the moving destination apparatus is moved to the information viewing apparatus 20 serving as the sender, it is also applicable that this sequential order is reversed, or both of the data moving operations are conducted at the same time.

Still further, in the present embodiment, the data moving operation is implemented only when the information viewing apparatus 20 to which the data can be moved is found. However, when the storage capacity of the storage device 32 of the management apparatus 30 is sufficiently large, it is also applicable that the data, stored in the storage device 22 of the information viewing apparatus 20 serving as the sender, is moved to the storage device 32 of the management apparatus 30 so as to temporarily keep the data in a standby state therein, and then, at the time when the information viewing apparatus 20 to which the data can be moved is found, the data kept in the standby state is copied into the information viewing apparatus 20 serving as the moving destination apparatus.

Again referring to the flowchart shown in FIG. 5, the controlling section (CPU 31) notifies the user of the information viewing apparatus 20 serving as the moving destination apparatus, so that the concerned user can recognize (distinguish) the information viewing apparatus 20 to which the data has been moved (Step S107).

In the present invention, the scope of the method for notifying the user of the information viewing apparatus 20 serving as the moving destination apparatus is not specifically limited. For instance, as shown in FIG. 10*a*, when each of the information viewing apparatuses 20 is provided with the LED (Light Emitting Diode) indicator, or when the LED indicators are disposed at the slots on the management apparatus 30, respectively corresponding to the information viewing apparatuses 20 to be inserted therein, by lighting the LED indicator corresponding to the information viewing apparatus 20 serving as the moving destination apparatus after the operation for moving the data has been completed, it is possible to notify the user of the information viewing apparatus 20 serving as the moving destination apparatus.

Alternatively, after the operation for moving the data has been completed, a message or a code, indicating the place of the information viewing apparatus 20 serving as the moving destination apparatus, is displayed on the display controller 24 of the information viewing apparatus 20 serving as the sender or the display section 36 of the management apparatus 30, as shown in FIG. 11, so as to notify the user of the information viewing apparatus 20 serving as the moving destination apparatus.

Further, when the operation for moving the data concerned is implemented, by changing the indication of the user's ID to be displayed, it also becomes possible to notify the user of the information viewing apparatus 20 to which the data concerned has been moved.

Figure 12A:
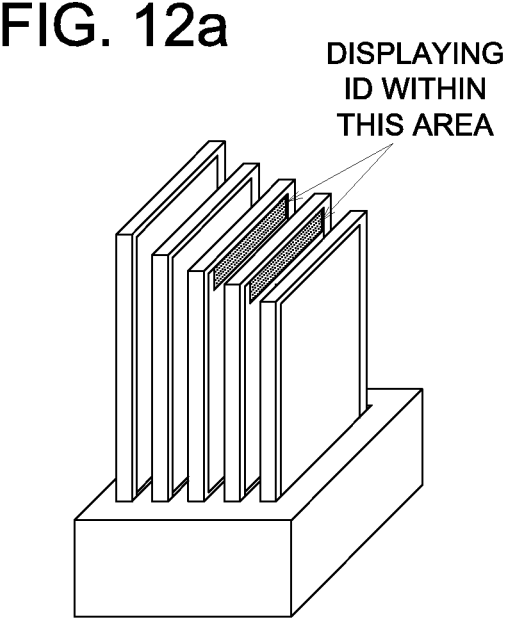
FIG. 12a, FIG. 12b, FIG. 12c and FIG. 12d, show schematic diagrams indicating various kinds of exemplified ID (IDentification) display sections.
Figure 12B:
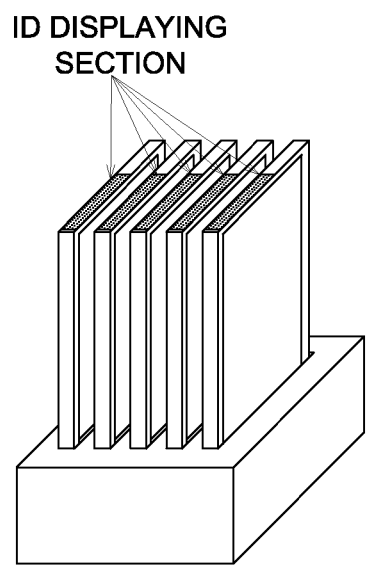

For instance, as shown in FIG. 12*a*, the management apparatus 30 is so configured that, when a plurality of the information viewing apparatuses 20 is installed into the management apparatus 30, the positions of the information viewing apparatuses 20, currently installed, are staggered relative to each other, and each of the user's IDs is displayed on such a portion within the display section 23 of each of the information viewing apparatuses 20 that is viewable by the user concerned (for instance, an upper area of the display section 23), so as to make it possible to notify the user of the information viewing apparatus 20 to which the data concerned has been moved. Alternatively, as shown in FIG. 12*b*, by disposing the user's ID display section at such a position that is viewable by the user even when a plurality of information viewing apparatuses 20 is installed into the management apparatus 30, such as a side surface of each of the information viewing apparatuses 20, etc., and by display the user's ID thereon, it becomes possible to notify the user of the information viewing apparatus 20 to which the data concerned has been moved.

Figure 12C:
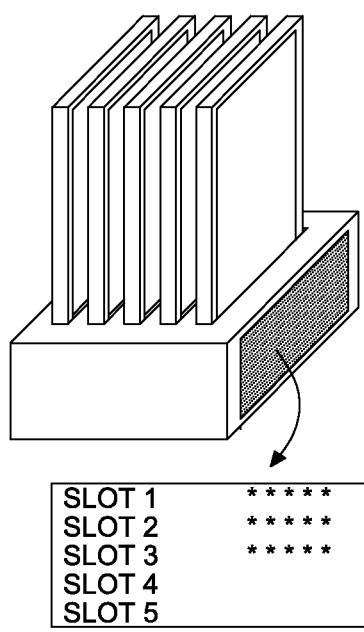
Figure 12D:
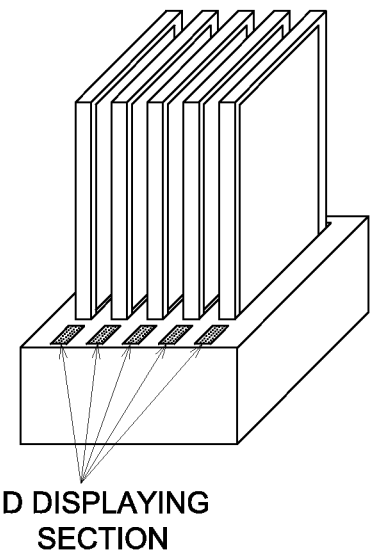

Further, as shown in FIG. 12*c*, by displaying both the slot numbers and the user's IDs on the display section 36 of the management apparatus 30 while correlating them with each other, or, as shown in FIG. 12*d*, by displaying each of the user's IDs onto corresponding one of the user's ID display sections, which are disposed on the management apparatus 30 at such positions that respectively correlate with the slots of the information viewing apparatuses 20, it becomes possible to notify the user of the information viewing apparatus 20 to which the data concerned has been moved.

In this connection, although the several methods have been exemplified in the foregoing while referring to the schematic diagrams shown in FIG. 10*a* through FIG. 12*d*, other than the above, any kind of method is applicable in the present invention, as far as the concerned method makes it possible for the user to distinguish the information viewing apparatus 20 serving as the moving destination apparatus. Further, the system can be so constituted that the user's ID is displayed only when the data is written into the information viewing apparatus 20 concerned, while no user's ID is displayed when no data is written into the information viewing apparatus 20 concerned (in the case of the vacant information viewing apparatus 20).

In the foregoing, the controlling operations, to be conducted when the data is moved from the information viewing apparatus 20 serving as the sender to the other information viewing apparatus 20 serving as the moving destination apparatus, have been detailed. However, since the information viewing apparatus 20 serving as the moving destination apparatus displays the images from the top of the data even when the user has viewed part of the images at the information viewing apparatus 20 serving as the sender, only by moving the data, it is necessary for the user to consume some labor time for finding the desired page at the other information viewing apparatus 20 serving as the moving destination apparatus. To solve the abovementioned problem and in order to improve the convenience and the usability for the user, according to the present embodiment, the information viewing apparatus 20, serving as the sender, notifies the other information viewing apparatus 20, serving as the moving destination apparatus, of the current viewing status of the user therein, so that the user can start to view the pages represented by the data from the current page same as that at the information viewing apparatus 20 serving as the sender.

Referring to flowcharts shown in FIG. 8 and FIG. 9, the operations to be conducted in the notification processing abovementioned will be detailed in the following. In this connection, FIG. 8 shows a flowchart indicating operations to be conducted in the management apparatus 30, while, FIG. 9 shows a flowchart indicating operations to be conducted in the information viewing apparatus 20.

Figure 8:
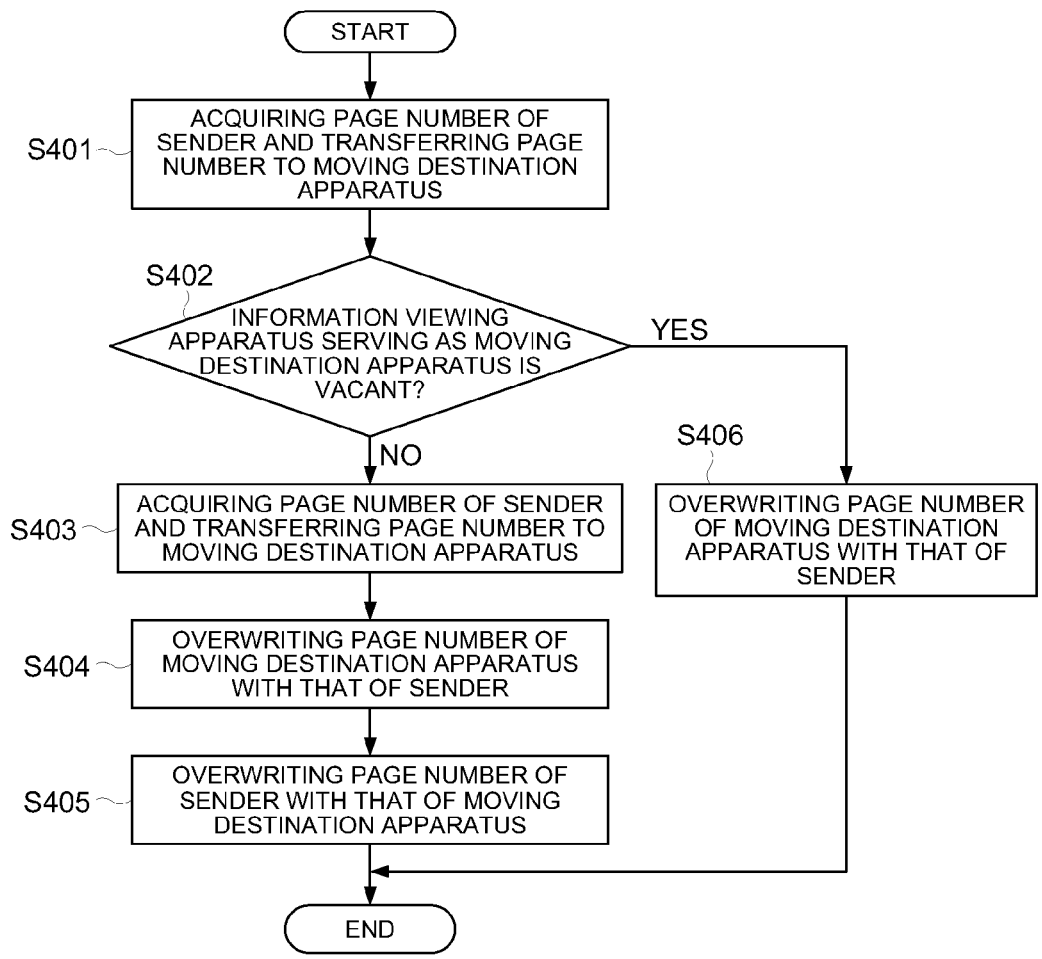
FIG. 8 shows a flowchart indicating operations (in regard to a page information transfer processing at a time of moving data) to be conducted in a management apparatus embodied in the present invention.
Figure 9:
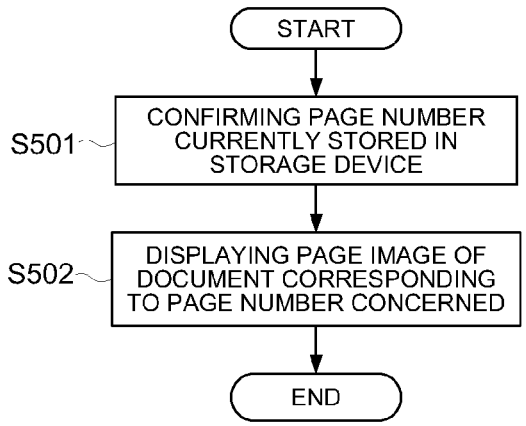
FIG. 9 shows a flowchart indicating operations (in regard to a display processing based on page information) to be conducted in an information viewing apparatus embodied in the present invention.

At first, as shown in FIG. 8, when moving the data (Step S106 in the flowchart shown in FIG. 5), the controlling section (CPU 31) acquires information for specifying the page currently displayed on the information viewing apparatus 20 serving as the sender, so as to transfer the page number of the page concerned to the information viewing apparatus 20 serving as the moving destination apparatus (Step S401). In this connection, the scope of the method for acquiring the page number is not specifically limited. For instance, when storing the page number in conjunction with the page currently displayed on the display section 23 into the storage device 22 and implementing the page proceeding operation or the jumping operation, the controlling section (CPU 31) of the information viewing apparatus 20 conducts the controlling operation for updating the page number concerned at the same time when conducting the displaying operation, so as to make it possible to acquire the page number from the storage device 22 of the information viewing apparatus 20 serving as the sender.

Successively, the controlling section (CPU 31) determines whether or not the other information viewing apparatus 20 serving as the moving destination apparatus is vacant (whether or not the data is originally stored in the other information viewing apparatus 20 serving as the moving destination apparatus) (Step S402). When determining that the other information viewing apparatus 20 serving as the moving destination apparatus is vacant (Step S402; Yes), controlling section (CPU 31) controls the other information viewing apparatus 20 to overwrite the page number stored in the storage device 22 with the new page number currently acquired from the information viewing apparatus 20 serving as the sender (Step S406)

On the other hand, when determining that the other information viewing apparatus 20 serving as the moving destination apparatus is not vacant (Step S402; No), the controlling section (CPU 31) acquires the page number stored in the storage device 22 of the other information viewing apparatus 20 serving as the moving destination apparatus, in order to transfer the above-acquired page number to the information viewing apparatus 20 serving as the sender (Step S403). Successively, the controlling section (CPU 31) controls the other information viewing apparatus 20 serving as the moving destination apparatus, so as to overwrite the page number, currently stored in the storage device 22 thereof, with the above-acquired page number, acquired from the information viewing apparatus 20 serving as the sender (Step S404), and also controls the information viewing apparatus 20 serving as the sender, so as to overwrite the page number, currently stored in the storage device 22 thereof, with the other page number, acquired from the information viewing apparatus 20 serving as the moving destination apparatus (Step S405).

Still successively, as indicated in the flowchart shown in FIG. 9, when the user inputs the instruction for displaying the data, the controlling section (CPU 31) confirms the page number currently stored in the storage device 22 of the information viewing apparatus 20 into which the page number has been overwritten according to the abovementioned procedure (Step S501), and makes the concerned information viewing apparatus 20 display the page image of the document corresponding to the page number concerned (Step S502).

As described in the above, by transferring the information (page number) for specifying the page of the document represented by the data, from the information viewing apparatus 20 serving as the sender to the other information viewing apparatus 20 serving as the moving destination apparatus, it becomes possible for the other information viewing apparatus 20, serving as the moving destination apparatus, to reproduce the status at the time when the viewing work was suspended, and accordingly, it becomes possible for the user to save the labor time for purposely finding the specific page at the time when the viewing work was suspended, resulting in improvement of the convenience and the usability for the user.

In this connection, the scope of the present invention is not limited to the aforementioned embodiments. Modifications and additions in regard to the configurations and the controlling operations, made by a skilled person without departing from the spirit and scope of the invention, shall be included in the scope of the present invention.

For instance, although the residual amount of the battery is represented by the ratio for the fully electric-charged amount in the aforementioned embodiments, it is also applicable that the residual amount of the battery is represented by the electric power amount, when the capacities of the information viewing apparatuses 20 are different from each other. Further, although the operations for moving the data are controlled on the basis of the residual amount of the battery in the aforementioned embodiments, when the capacities of the information viewing apparatuses 20 are different from each other, it is also applicable that the operations for moving the data are controlled on the basis of the usable time of the battery, which is derived by dividing the residual amount of the battery by the electric power consumption.

Further, although the aforementioned embodiment have been described in regard to the controlling operations for moving the data between the information viewing apparatuses 20, the present invention is also applicable to any kind of apparatus that is activated by the battery to process data, as well.

The present invention is available for such a system that includes an information viewing apparatus, such as the Electrophoretic Display, etc., and a management apparatus that can support a plurality of the information viewing apparatuses.

According to any one of a management apparatus, a management system and a management method, embodied in the present invention, it becomes possible to use an information viewing apparatus without considering the residual amount of the battery provided therein.

This is because, when an information viewing apparatus is inserted into one of the plurality of slots provided in a management apparatus, the concerned management apparatus, which supports a plurality of information viewing apparatuses in a detachable manner, acquires the information in regard to the residual amount of the battery of the information viewing apparatus concerned, and then, conducts the controlling operations for moving the data stored in the concerned information viewing apparatus to the other information viewing apparatus coupled to the management apparatus (for instance, the other information viewing apparatus whose residual amount of the battery is greater than that of the information viewing apparatus concerned).

While the preferred embodiments of the present invention have been described using specific term, such description is for illustrative purpose only, and it is to be understood that changes and variations may be made without departing from the spirit and scope of the appended claims.

What is claimed is:

1. A management apparatus for use with a plurality of information viewing apparatuses, including a first information viewing apparatus and a second information viewing apparatus, each of the plurality of information viewing apparatus structured to be powered from a battery provided therein, the management apparatus comprising:
    a plurality of slots, each of the plurality of slots being structured as a cradle, which accommodates one of the plurality of information viewing apparatuses therein, without operating said one of the plurality of information viewing apparatuses, and each of the plurality of slots being structured to support one of the plurality of information viewing apparatuses in a detachable manner; and
    a controlling section to control the plurality of information viewing apparatuses, respectively inserted into the plurality of slots;
    wherein, the controlling section is structured to control both the first information viewing apparatus and the second information viewing apparatus, so as to move data stored in the first information viewing apparatus to the second information viewing apparatus depending on a residual amount of a first battery provided in the first information viewing apparatus; and
    wherein the controlling section compares the residual amount of the first battery, provided in the first information viewing apparatus, with that of a second battery provided in the second information viewing apparatus, and then, when determining that the residual amount of the first battery is equal to or smaller than predetermined value and the residual amount of the second battery is greater than that of the first battery, the controlling section moves the data from the first information viewing apparatus to the second information viewing apparatus, in such a manner that the controlling section copies the data, stored in the first information viewing apparatus, into the second information viewing apparatus, and then, deletes the data from the first information viewing apparatus.

2. The management apparatus of claim 1,
    wherein, when plural information viewing apparatuses among the plurality of information viewing apparatuses correspond to the second information viewing apparatus, the controlling section moves the data to specific one of the plural information viewing apparatuses, in which the residual amount of the second battery is the greatest among those in the plural information viewing apparatuses corresponding to the second information viewing apparatus.

3. The management apparatus of claim 1,
    wherein, when other data has been stored in advance into the second information viewing apparatus, the controlling section moves the other data stored in the second information viewing apparatus to the first information viewing apparatus.

4. The management apparatus of claim 1, further comprising:
    a display section;
    wherein the controlling section makes the display section display information for notifying a user of the second information viewing apparatus to which the data is moved.

5. The management apparatus of claim 1,
    wherein the controlling section makes a display section, provided on the first information viewing apparatus, display information for notifying a user of the second information viewing apparatus to which the data is moved, thereon.

6. A management system, comprising:
    a plurality of information viewing apparatuses, including a first information viewing apparatus and a second information viewing apparatus, each of which is powered from a battery provided therein; and
    a management apparatus comprising:
    a plurality of slots, each of the plurality of slots being structured as a cradle, which accommodates one of the plurality of information viewing apparatuses therein, without operating said one of the plurality of information viewing apparatuses, and each of the plurality of slots being structured to support one of the plurality of information viewing apparatuses in a detachable manner; and
    a controlling section to control the plurality of information viewing apparatuses, respectively inserted into the plurality of slots;
    wherein, the controlling section is structured to control both the first information viewing apparatus and the second information viewing apparatus, so as to move data stored in the first information viewing apparatus to the second information viewing apparatus depending on a residual amount of a first battery provided in the first information viewing apparatus; and
    wherein, when displaying a document based on the data, the first information viewing apparatus stores page information for specifying a latest page of the document, which is finally displayed on the first information viewing apparatus, and then, the management apparatus acquires the page information from the first information viewing apparatus, so as to transfer the page information to the second information viewing apparatus;
    wherein the controlling section compares the residual amount of the first battery, provided in the first information viewing apparatus, with that of a second battery provided in the second information viewing apparatus, and then, when determining that the residual amount of the first battery is equal to or smaller than a predetermined value and the residual amount of the second battery is greater than that of the first battery, the controlling section moves the data from the first information viewing apparatus to the second information viewing apparatus, in such a manner that the controlling section copies the data, stored in the first information viewing apparatus, into the second information viewing apparatus, and then, deletes the data from the first information viewing apparatus; and
    wherein, when displaying the document based on the data, the second information viewing apparatus refers to the page information so as to display the latest page of the document at first.

7. A management method to be employed in a system that comprises a plurality of information viewing apparatuses, each of which is activated by an electric power fed from a battery provided therein, and a management apparatus that includes a plurality of slots, each of the plurality of slots being structured as a cradle, which accommodates one of the plurality of information viewing apparatuses therein, without operating said one of the plurality of information viewing apparatuses, and each of the plurality of slots being structured to support one of the plurality of information viewing apparatuses in a detachable manner, the management method comprising:
- storing a first information viewing apparatus of the plurality of information viewing apparatuses in a first slot of the plurality of slots, the first information viewing apparatus being stored in a non-operating state;
- storing a second information viewing apparatus of the plurality of information viewing apparatuses in a second slot of the plurality of slots, the second information viewing apparatus being stored in a non-operating state;
- acquiring a residual amount of a first battery provided in the first information viewing apparatus;
- comparing the residual amount of the first battery, provided in the first information viewing apparatus, with that of a second battery provided in the second information viewing apparatus; and
- moving data stored in the first information viewing apparatus to the second information viewing apparatus, when determining that the residual amount of the first battery is equal to or smaller than a predetermined value and the residual amount of the second battery is greater than that of the first battery, in such a manner that the data, stored in the first information viewing apparatus, is copied into the second information viewing apparatus, and then, the data is deleted from the first information viewing apparatus.

8. The management method of claim 7, further comprising:
displaying information for notifying a user of the second information viewing apparatus, to which the data is moved, onto a display section equipped on the management apparatus, after the data has been moved in the moving step.

9. The management method of claim 7, further comprising:
displaying information for notifying a user of the second information viewing apparatus, to which the data is moved, onto a display section equipped on the first information viewing apparatus, after the data has been moved in the moving step.

10. The management method of claim 7,
wherein, when displaying a document based on the data, the first information viewing apparatus stores page information for specifying a latest page of the document, which is finally displayed on the first information viewing apparatus, and then, the management apparatus acquires the page information from the first information viewing apparatus, so as to transfer the page information to the second information viewing apparatus; and
wherein, when displaying the document based on the data, the second information viewing apparatus refers to the page information so as to display the latest page of the document at first.

* * * * *